Figure 1:
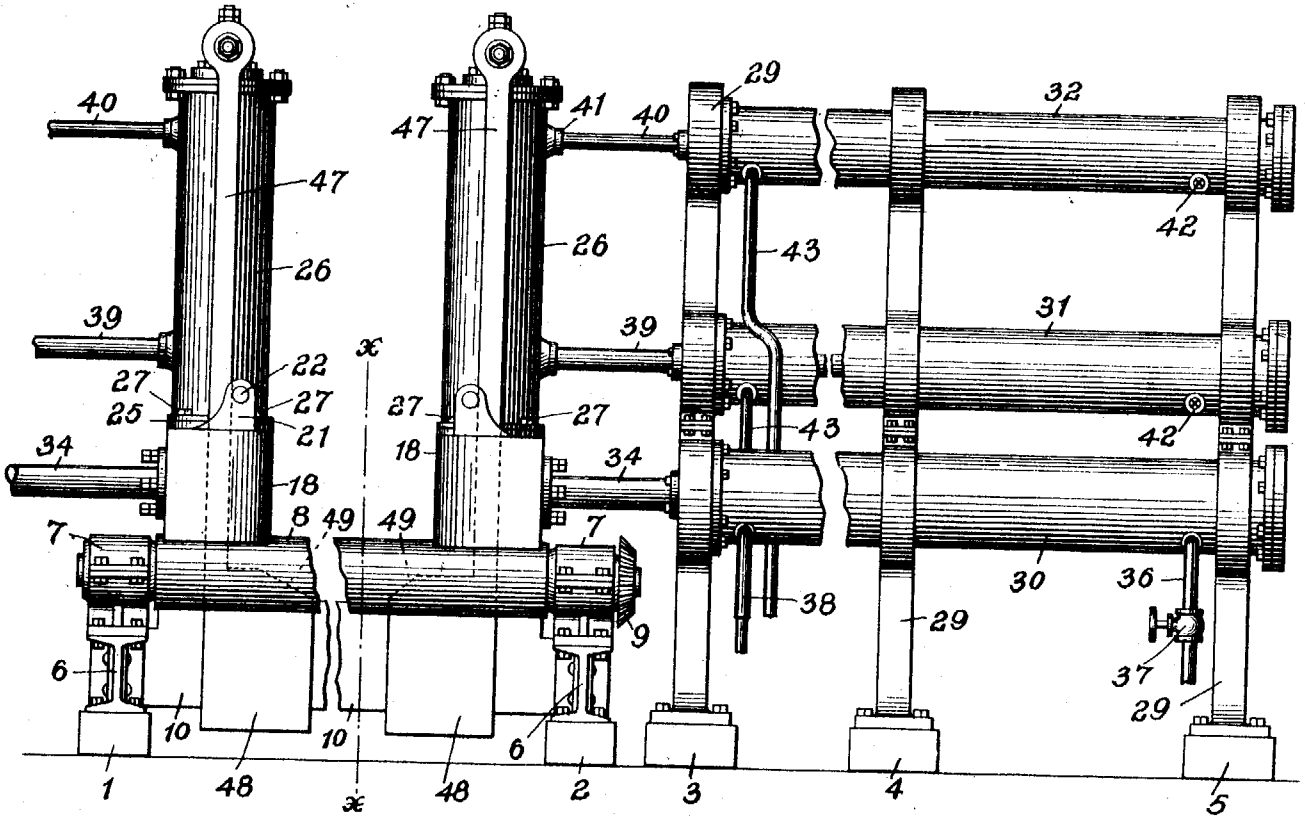

Draftsman.

J. W. WEBER.

MANIPULATOR.

APPLICATION FILED APR. 20, 1908.

12,859.

Reissued Sept. 29, 1908.

4 SHEETS—SHEET 1

WITNESSES:

J. Herbert Bradley

Francis J. Tomasek

INVENTOR

John W. Weber, by Christy & Christy Att'ys

THE BORDEN PETERS CO., WASHINGTON, D. C.

TAL ROLLING
eeding, Tables,
Shifters

Drawing

J. W. WEBER.

MANIPULATOR.

APPLICATION FILED APR. 20, 1908.

12,859.

Reissued Sept. 29, 1908.

4 SHEETS—SHEET 2.

WITNESSES:

J. Herbert Bradley.
Francis J. Comerford

INVENTOR

John W. Weber,
by Christy & Christy, Atty's

THE NORRIS PETERS CO., WASHINGTON, D. C.

ETAL ROLLING,
eeding, Tables,
Shears.

J. W. WEBER.

MANIPULATOR.

APPLICATION FILED APR. 20, 1908.

12,859.

Reissued Sept. 29, 1908.

4 SHEETS—SHEET 3.

WITNESSES:

J. Herbert Bradley.

Francis J. Tomanson

INVENTOR

John W. Weber, by Christy & Christy Attys

THE NORRIS PETERS CO., WASHINGTON, D. C.

METAL ROLLING
Feed Tables,
Shifters

Draftsman.

J. W. WEBER.

MANIPULATOR.

APPLICATION FILED APR. 20, 1908.

12,859.

Reissued Sept. 29, 1908.

4 SHEETS—SHEET 4.

WITNESSES:
J. Herbert Bradley
Francis J. Tomaszewski

INVENTOR
John W. Weber,
by Christy & Christy, Atty's

THE NORRIS PETERS CO., WASHINGTON, D. C.

ROLLING
Feeding
Draftsman.

UNITED STATES PATENT OFFICE.

JOHN W. WEBER, OF PITTSBURG, PENNSYLVANIA.

MANIPULATOR.

No. 12,859. Specification of Reissued Letters Patent. Reissued Sept. 29, 1908.

Original No. 843,422, dated February 5, 1907, Serial No. 309,340. Application for reissue filed April 20, 1908. Serial No. 428,295.

*To all whom it may concern:*

Be it known that I, JOHN W. WEBER, residing at Pittsburg, in the county of Allegheny and State of Pennsylvania, a citizen of the United States, have invented or discovered a certain new and useful Improvement in Manipulators, of which improvement the following is a specification.

This invention relates to certain new and useful improvements in manipulators, and relates particularly to a manipulator for iron and steel during the manufacture of various products from ingots or billets.

The manipulator is particularly adapted for merchant mills, blooming-mills and mills wherein large pieces of heated iron and steel are reduced to commercial sizes.

The primary object of my invention is to provide a novel and unique form of manipulator by which an ingot or billet may be readily and effectually handled. To this end I aim to provide a simple and easily-manipulated apparatus by which an ingot of considerable weight can be easily and quickly turned. The apparatus in its entirety can be easily controlled by one operator, who simply manipulates a valve or valves to rapidly turn pieces of material.

With the above and other objects in view, which will more readily appear as the nature of the invention is better understood, the same consists in the novel construction and combination of parts to be hereinafter more fully described and claimed, and, referring to the drawings accompanying this application, like numerals of reference designate corresponding parts throughout the several views, in which—

Figure 2:
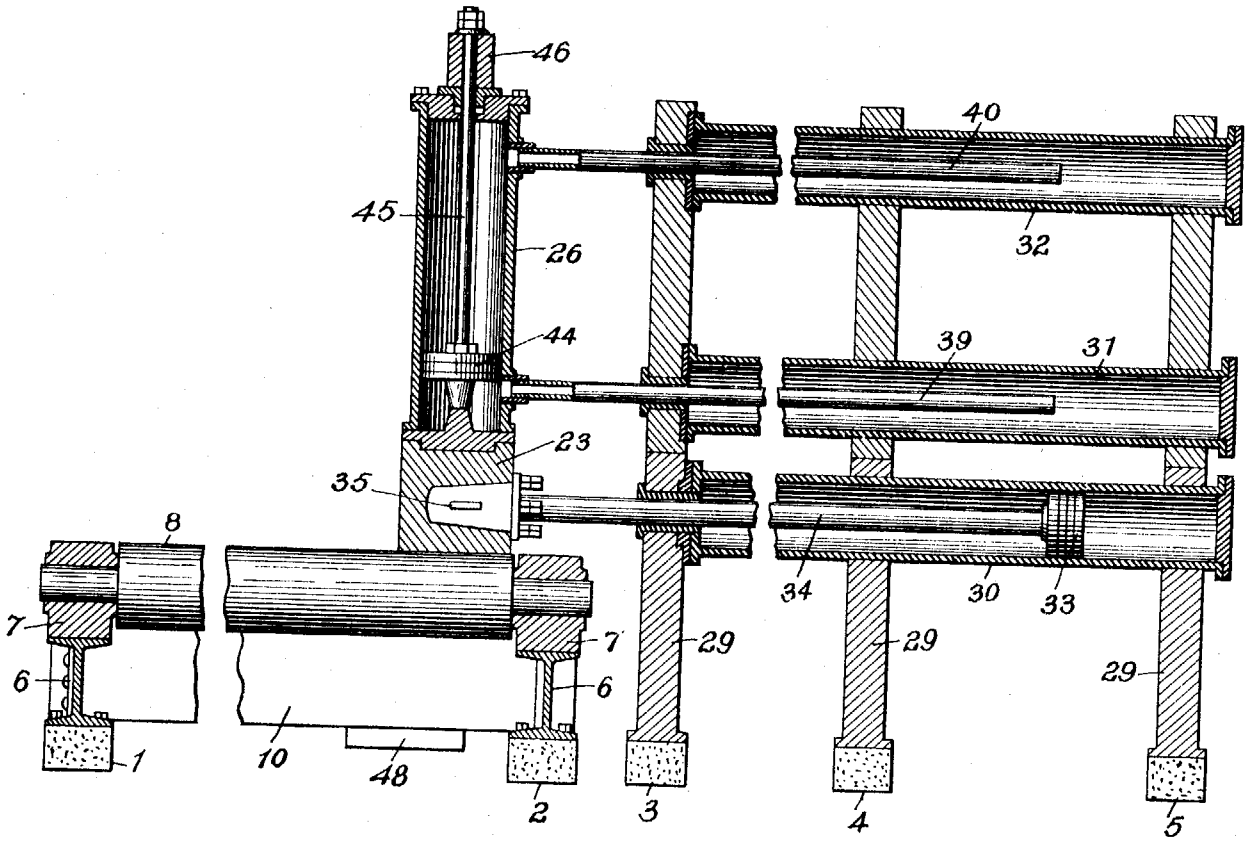
Figure 3:
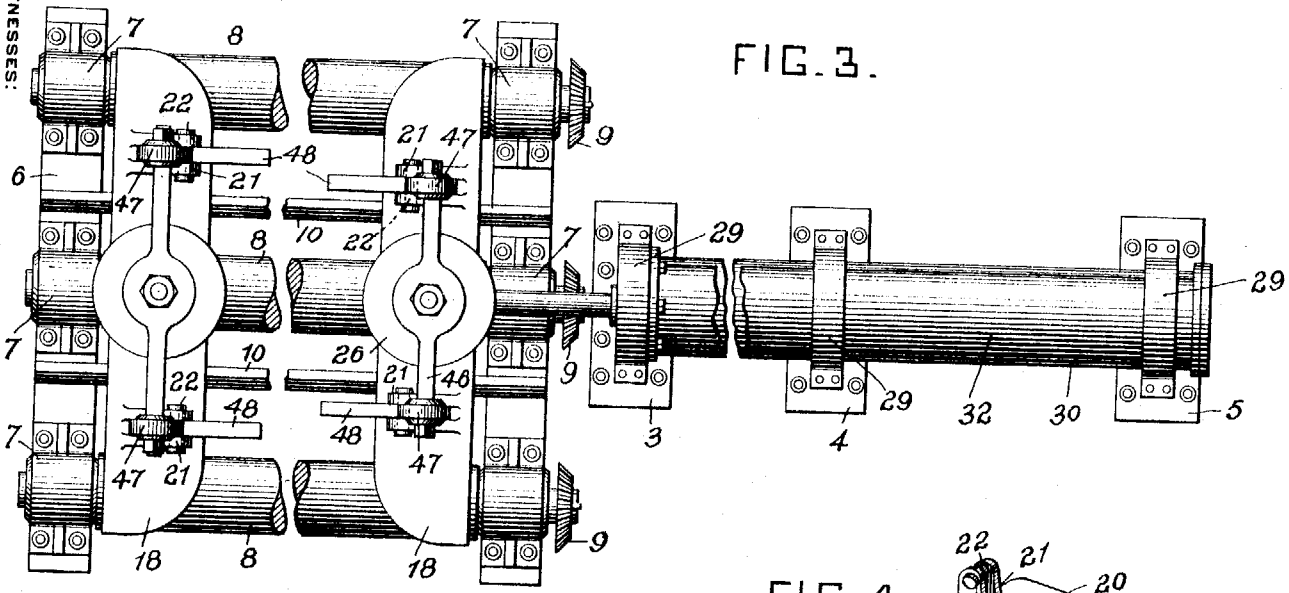
Figure 4:
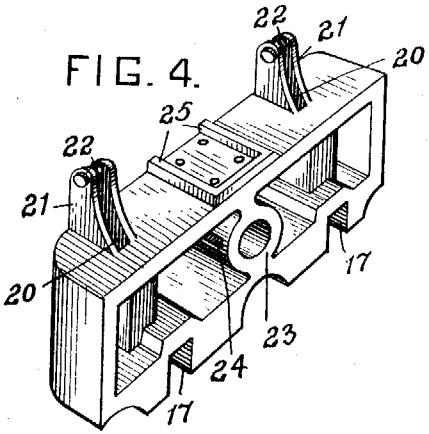
Figure 5:
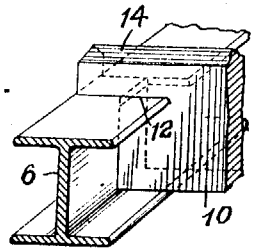
Figure 8:
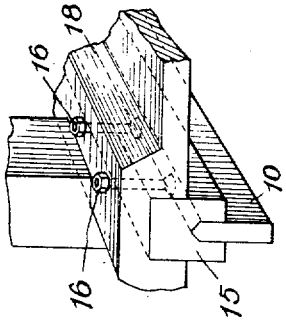
Figure 9:
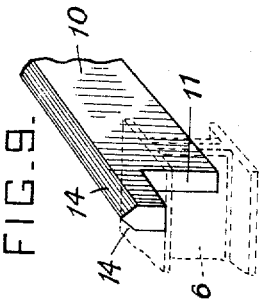
Figure 7:
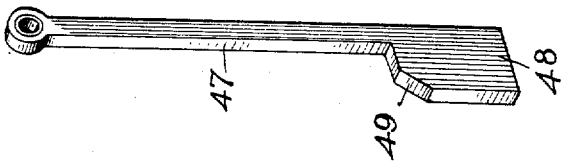
Figure 6:
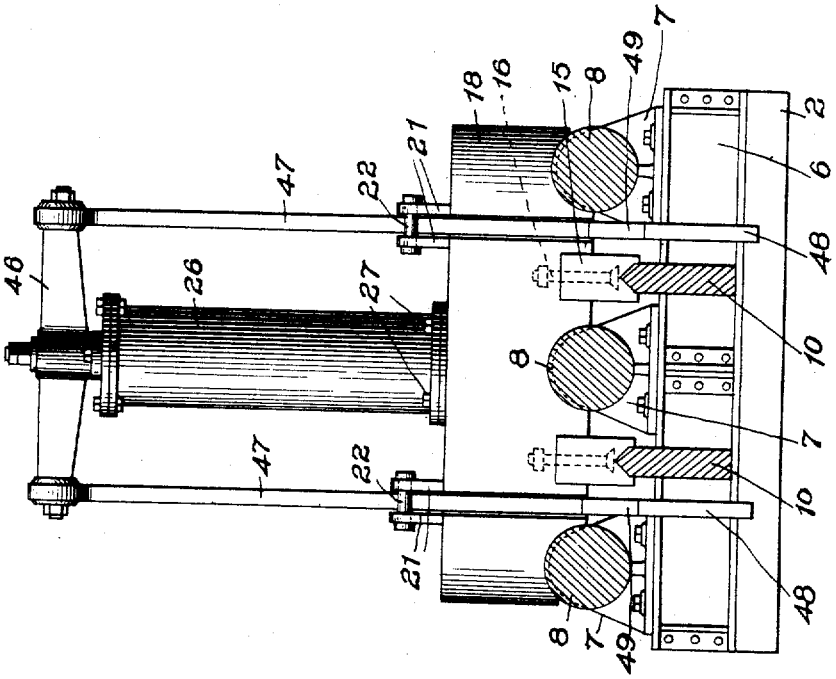

Figure 1 is a side elevation of my improved apparatus, partly broken away. Fig. 2 is a fragmentary longitudinal sectional view of the same. Fig. 3 is a plan of the apparatus, partly broken away. Fig. 4 is a perspective view of one of the movable heads of the apparatus. Fig. 5 is a detail perspective view of a portion of the apparatus, illustrating one end of one of the transverse guideways. Fig. 6 is a cross-sectional view taken on the line *x x* of Fig. 1. Fig. 7 is a perspective view of one of the turning-bars of the apparatus. Fig. 8 is a detail perspective view of a portion of one of the heads of the apparatus. Fig. 9 is a detail perspective view of a portion of one of the guideways of the apparatus.

To put my invention into practice, I construct my improved apparatus upon suitable strong and durable foundations 1, 2, 3, 4, and 5, the foundations 1 and 2 being four in number, which support longitudinal I-beams 6 6. Upon the I-beams are mounted a plurality of bearings or journal-boxes 7 of suitable form, and in said bearings are journaled a plurality of transversely-disposed rollers 8, the ends or necks of said rollers being provided with beveled gear-wheels 9, whereby they may be driven from a common shaft, (not shown), which is driven by a motor or from a suitable source of energy or power.

Between the I-beams 6 6 of the apparatus are mounted two transverse guideways 10 10, said guideways having their ends cut away, as at 11, to fit within slots 12, provided therefor in the I-beams 6, the manner of joining the guideways to the I-beams being clearly shown in Figs. 5 and 9, wherein it will be observed that the guideways are prevented from being laterally displaced or becoming disengaged from said I-beams. The upper edges of the guideways are beveled, as at 14 14, and upon the beveled edges are adapted to slide blocks 15 15. The blocks 15 are secured by nuts and bolts 16 16 within recesses 17 17 formed in the lower faces of heads 18 18, one of said heads being clearly illustrated in Fig. 4 of the drawings.

In practice I mount two heads upon the guideways 10 10, these heads confronting one another and being independently controlled, as will be presently described. Each head consists of an oblong recessed body 18, having vertically-disposed grooves 20 20 formed therein adjacent to its ends, the exit of said openings upon the top of the head being guarded by two vertically-disposed pierced lugs or brackets 21 21, carrying pins 22 22. Each head carries a central sleeve or boss 23, having slots 24 formed therein. The top of each head is provided with a flanged seat 25, and engaging in each seat upon each head is a vertically disposed cylinder 26. The base of each cylinder 26 is secured to the top of each head by screw-bolts 27, which pass into openings 28 formed in each head.

As two cylinders 26 26 and two heads 18 are employed in connection with my apparatus and as the heads, cylinders, and their appurtenant parts are identical in construction one to the other, I deem it only necessary to describe one cylinder, head, and its appurtenant parts, which constitute one-half of my improved apparatus. In describing one half or side of the apparatus I desire it to be understood at all times that the opposite side of the apparatus is similar in construction and performs similar functions as that side of the apparatus to be presently described, both sides being capable of manipulating pieces of material upon the rollers 8 between the heads 18 18.

Upon the foundations 3, 4, and 5, which aline with one another and with the central-most roller 8 of the apparatus, I erect vertically-disposed frames 29 29 29, said frames supporting cylinders 30, 31, and 32, transversely disposed with respect to the table which is formed of the longitudinal I-beams and the transversely-disposed rolls mounted on said I-beams, the cylinders being located one above the other. In the cylinder 30 is mounted a piston-head 33, said head being provided with a piston-rod 34, which extends through the frame 29 and is secured in the head 18 by a key 35. Communicating with the cylinder 30 near one end is a water-receiving pipe 36 and near the other end a similar pipe 38, the pipe 36 having a valve 37 therein. The pipe 36 acts as the water-inlet pipe, and the pipe 38 as the water-outlet pipe when the piston is moving in one direction, and when the piston is moving in the opposite direction pipe 38 acts as the pressure-pipe, while pipe 36 serves as the outlet-pipe.

In the cylinder 31 is slidably mounted a tube 39, said tube extending through the frame 29 and connecting with the lower end of the cylinder 26. In the cylinder 32 is also mounted a tube 40, said tube connecting with the upper end of the cylinder 26, as at 41. The cylinders 31 and 32 are provided with drain-plugs 42 42, whereby the cylinders may be readily cleansed. The forward ends of the cylinders are provided with water-inlet pipes 43 43, which supply said cylinders with water.

In the cylinder 26 is mounted a piston-head 44, of a conventional form, said head having a piston-rod 45, connecting with a cross-head 46. The ends of the cross-head 46 are provided with depending turning-bars 47 47, said bars extending through the vertically-disposed grooves 20 20 of the head 18 and being guided in said openings by the lugs or brackets 21 21 and the pins 22 22, which serve functionally as rollers. The lower ends of the turning-bars are enlarged, as at 48, and are provided with beveled edges 49 49, the enlarged end and beveled edges of the turning-bars serving to turn a piece of material upon the rollers 8 when the turning-bars are elevated.

As both sides of the apparatus are identical in construction, as heretofore stated, I will simply describe the operation of one side of the apparatus—for instance, the right-hand side, which is clearly illustrated and which is adapted to manipulate a piece of material to turn it to the left. The cylinder 30 and its appurtenant parts serve functionally as a hydraulic cylinder for moving the head 18 back and forth upon the guideways 10 10, the operation of this cylinder being controlled by a conventional form of valve. The raising and lowering of the turning-bars 47 is controlled by the cylinders 31 and 32. When water enters the cylinder 31, it passes through the tube 39 to the cylinder 26, forces the head 44 upwardly, and raises the cross-head 46, carrying the turning-bars. As these bars travel upwardly they engage the underside of the piece of material upon the rollers 8 8 and turn the same to the left upon its side. When the piston-head 44 travels upwardly within the cylinder 26, water carried within the cylinder above the piston-head is forced into the cylinder 32, and, assuming that the water is permitted to recede from beneath the piston-head 44 into the cylinder 31, the water within the cylinder 32 serves to force the head 44 downwardly, returning it to its normal position. The cylinder 32 simply serves for this purpose of returning the piston-head 44, and in slidably mounting the tubes 39 and 40 within their respective cylinders I am enabled to adjust the head 18 irrespective of the cylinders 30 to 32, inclusive, thus being able to manipulate a piece of material upon the rollers 8 8 irrespective of the position they assume relative to the heads 18 18.

By the novel construction of my improved apparatus I am enabled to longitudinally adjust the heads 18 18 to engage a piece of material, while the rollers 8 8 are adapted to shift the piece of material longitudinally of the apparatus, and when the rollers are made of a sufficient width more than one piece of material can be manipulated at one time upon the apparatus.

The entire apparatus is constructed of strong and durable metal, whereby it will withstand the rough usage to which it is subjected, particularly by large and heavy pieces of material being manipulated upon the apparatus.

I do not care to confine myself to the size, proportion, and minor details of constructions, as such changes as are permissible by the appended claims may be resorted to without departing from the spirit and scope of the invention.

What I claim, and desire to secure by Letters Patent, is—

1. In a manipulator, the combination with rollers, and guideways mounted between said rollers, a head slidably mounted upon said guideways, a cylinder carried by said head, a piston slidably mounted within said cylinder, depending turning-bars raised and Feeding, Tables,
Draftsman lowered by said piston-head, a frame mounted adjacent to said rollers, cylinders supported by said frame, a piston-rod mounted in one of said cylinders and connecting with said head to move said head upon said guideways, tubes extending into the other of said cylinders and connecting with the first-named cylinder, substantially as described.

2. In a manipulator, a table comprising a suitable support and a plurality of rollers transversely arranged thereon, guideways arranged transversely of the support, a head slidably mounted on said guideways, a vertically-disposed cylinder mounted on said head, a piston therein having its rod extending through the upper end of the cylinder, a cross-head on said rod, turning-bars suspended from said cross-head, a plurality of transversely disposed cylinders arranged adjacent the table, a piston in one of said cylinders having its rod connected to said head, and tubes communicating with the vertical cylinder and extending into the others of said horizontal cylinders.

3. In a manipulator, a table embodying a support and a plurality of rollers arranged transversely of the support, guideways arranged transversely of the support, a head mounted to slide on said guideways and having upwardly-extending brackets, a cylinder mounted on said head, a piston in said cylinder having its rod extending through the upper end of the cylinder, a cross-head on said rod, turning-bars suspended from said cross-head and extending through the sliding head and guided by said brackets, and hydraulic means for actuating the sliding head and the piston in said vertical cylinder to operate the turning bars.

4. In a manipulator, a work-receiving table, a head mounted thereon, a vertical cylinder carried by said head, a piston within said cylinder having its rod extending through the upper end of the cylinder, a cross-head on said rod, turning-bars carried by said cross-head and extending through the sliding head, and hydraulic means for actuating the sliding head and the piston in said vertical cylinder for operating the turning-bars.

5. In a manipulator for ingots, the combination of a work-receiving table, a slidably-mounted head, a cylinder carried by the head, a piston in said cylinder having its rod extending through the end of the cylinder, a cross-head on said rod, turning-bars carried by said cross-head and extending through the slidable head and hydraulic means for operating the sliding head to move it across the work-receiving table, and other hydraulic means for actuating the piston to operate the turning-bars.

6. The combination of feed rolls, a head movable above the rollers and longitudinally thereof, vertically movable turning-bars carried by the head and means connected to said bars above the plane of the rollers for reciprocating the bars.

7. The combination of a head movable above the rollers and longitudinally thereof, turning bars guided by the head, and means above the plane of the feed rollers and carried by the head for reciprocating the turning bars.

8. The combination of feed rollers, a head movable above the rollers and longitudinally thereof, a turning bar provided with a shoulder for engaging the ingot and movable with the head, and means connected to the turning bar at a point above the shoulder for shifting the bar.

9. The combination of feed rollers, a head movable above and longitudinal of the rollers, turning-bars mounted on the head, a motor carried by the head and connected to the turning bars and means for reciprocating the head.

10. The combination of feed rollers, a head movable above and longitudinal of the rollers, turning-bars vertically movable in said head, fluid pressure motor for reciprocating the turning-bars mounted on the head, and means for reciprocating the head.

11. The combination of feed rollers, a head movable above the rollers and longitudinally thereof, means carried by the head for turning an ingot through an arc of ninety degrees, and means movable with the head and arranged outside of the area beneath the feed rollers, for shifting the ingot turning means.

In testimony whereof I have hereunto set my hand.

JOHN W. WEBER.

Witnesses:
J. HERBERT BRADLEY,
CHARLES BARNETT.